(12) United States Patent
Abel

(10) Patent No.: US 8,215,422 B2
(45) Date of Patent: Jul. 10, 2012

(54) EMERGENCY UTILITY VEHICLE

(75) Inventor: Thomas E. Abel, New Philadelphia, OH (US)

(73) Assignee: Alternative Support Apparatus, LLC, Midvale, OH (US)

(*) Notice: Subject to any disclaimer, the term of this patent is extended or adjusted under 35 U.S.C. 154(b) by 1216 days.

(21) Appl. No.: 11/158,486

(22) Filed: Jun. 22, 2005

(65) Prior Publication Data
US 2007/0007053 A1 Jan. 11, 2007

Related U.S. Application Data

(60) Provisional application No. 60/581,942, filed on Jun. 22, 2004.

(51) Int. Cl.
B62D 61/10 (2006.01)

(52) U.S. Cl. .............................. 180/22; 296/19

(58) Field of Classification Search .................. 180/22, 180/24.08, 233, 311, 312; 296/19, 20; A61G 3/00
See application file for complete search history.

(56) References Cited

U.S. PATENT DOCUMENTS

| 3,340,402 | A | * | 9/1967 | Curtis | 307/48 |
| 3,876,183 | A | * | 4/1975 | Strout et al. | 242/157 R |
| 4,664,208 | A | * | 5/1987 | Horiuchi et al. | 180/23 |
| 4,785,227 | A | * | 11/1988 | Griffin | 322/1 |
| 5,012,880 | A | | 5/1991 | Abner | |
| 5,212,431 | A | * | 5/1993 | Origuchi et al. | 318/139 |
| 5,236,390 | A | | 8/1993 | Young et al. | |
| 5,287,938 | A | | 2/1994 | Welling et al. | |
| 5,476,146 | A | | 12/1995 | Brown | |
| 5,573,300 | A | | 11/1996 | Simmons | |
| 5,781,013 | A | | 7/1998 | Takahashi | |
| 5,785,372 | A | | 7/1998 | Glatzmeier et al. | |
| 5,869,951 | A | | 2/1999 | Takahashi | |
| 5,879,482 | A | * | 3/1999 | Rooney et al. | 152/209.16 |
| 5,950,750 | A | * | 9/1999 | Dong et al. | 180/24.09 |
| 5,954,148 | A | * | 9/1999 | Okumura et al. | 180/9.21 |
| 6,254,159 | B1 | * | 7/2001 | Wieczorek et al. | 296/19 |
| 6,340,177 | B1 | | 1/2002 | Granderson et al. | |
| 7,021,664 | B2 | * | 4/2006 | Mercier et al. | 280/834 |
| 7,108,086 | B2 | * | 9/2006 | Hurlburt | 180/22 |
| 2002/0000731 | A1 | | 1/2002 | Wieczorek et al. | |

FOREIGN PATENT DOCUMENTS

| DE | 10016985 | | 5/2002 |
| EP | 219469 | A1 * | 4/1987 |
| FR | 1522417 | | 7/1968 |
| FR | 2746352 | | 9/1997 |

* cited by examiner

Primary Examiner — Paul N Dickson
Assistant Examiner — Robert A Coker

(57) ABSTRACT

An off-road emergency vehicle includes an operator compartment with an environmentally controlled atmosphere and wireless communication devices. The modified, extended all-terrain vehicle frame supports an enclosed equipment compartment having a top and sides. The equipment compartment is large enough to enclose a full-length stretcher for someone in need of care in an off-road area. The equipment compartment also contains a bench for an emergency technician and storage. The vehicle includes a secondary power source used to supply power to the lighting system and equipment of the equipment compartment.

24 Claims, 4 Drawing Sheets

EMERGENCY UTILITY VEHICLE

This application claims priority to U.S. Ser. No. 60/581,942, entitled, EMERGENCY UTILITY VEHICLE, filed Jun. 22, 2004, which is incorporated herein by reference. This invention pertains to the art of methods and apparatuses of emergency service vehicles, and more specifically to a utility vehicle having emergency care service and storage capabilities.

I. BACKGROUND OF THE INVENTION

A. Field of Invention
B. Brief History

In recent years, the need to provide emergency services, including medical, ambulance, and firefighting services, in rugged or tightly defined or enclosed spaces has been addressed by the creation of small variations of traditional fire engines and ambulances, which are typically reconfigured all terrain-type vehicles (ATVs), having a standard ATV chassis configured in the rear portion to receive fire fighting equipment or medical personnel and equipment. One such device is presented in U.S. Pat. No. 5,573,300 to Simmons, which discloses a utility vehicle adapted to receive separate, interchangeable modules where each module is outfitted with equipment for responding to a particular type of emergency. Another device is presented in U.S. Pat. No. 5,012,880 to Abner, which discloses a mini-ambulance type device built on an all materials transport vehicle chassis. Finally, U.S. Pat. Nos. 5,785,372 and 5,476,146 to Glatzmeier and Brown respectively, disclose fire fighting vehicles, which are comprised of, in the case of the '146 patent, a modified ATV and in the case of the '372 patent, a fire fighting module adaptable to be received onto utility vehicles.

All of the above referenced devices and other similar devices known in the art essentially utilize a standard ATV-type chassis; however, for reasons discussed herein below, the standard chassis of existing ATVs and similar, suitable, substitutable, all-terrain vehicles are too short to provide adequate room for medical personnel, equipment, and drivers. Often injured individuals either extend out the rear of the vehicle, which is unsafe in difficult terrain, or extend into the front passenger area, which limits a seat in the vehicle for other personnel, or must sit up, which may be impractical. Moreover, the electrical requirements of these vehicles are generally inadequate to the rear compartments of these emergency vehicles, and useful devices, such as scene lighting, air conditioning and refrigeration particularly in medical assistance vehicles. This is not adequately addressed in the current art or the above references. Finally, in extreme conditions, vehicles need to be largely self sufficient, having a suspension, tires, room, and electrical power suitable for enabling the vehicle to approach an emergency, provide assistance, and leave the area safely. What is needed, therefore, is a relatively small emergency care vehicle, that includes a suspension and frame suited for off-road conditions, appropriate auxiliary power supplied to the rear compartment, and a length suitable for receiving and enclosing equipment and personnel, including a stretcher. The following invention addressed these problems.

II. SUMMARY OF THE INVENTION

One aspect of the subject invention includes an off road emergency vehicle including a vehicle frame having a rugged suspension for use in traversing uneven terrain, the vehicle frame having front and rear portions, at least a first axle operatively attached to the vehicle frame, at least first and second ground engaging wheels operatively, rotatably attached to the at least a first axle for use in maneuvering the vehicle, an engine operatively attached to the vehicle frame for use in providing locomotion to the vehicle, a vehicle battery operatively connected to the engine, an operator compartment fixedly attached to the front portion of the vehicle frame, an enclosed equipment compartment, which may be an emergency care treatment compartment, fixedly attached to the rear portion of the frame, the equipment compartment having a characteristic length sufficiently long enough to enclose an industry standard stretcher in a locking system, and, an equipment compartment power supply operatively connected to provide power to the equipment compartment.

Another aspect of the subject invention includes an emergency vehicle having a modified vehicle frame, which is a standard all terrain vehicle frame that has been extended in length up to approximately 30 inches.

Another aspect of the subject invention includes an equipment compartment power supply that includes a second power supply operatively connected thereto to provide power to the equipment compartment.

Yet another aspect of the subject invention includes a second power supply that is operatively connected to a vehicle mounted generator.

Yet another aspect of the subject invention includes a vehicle wherein the at least a first axle is operatively attached to rear portion of the frame, and, further including a second axle operatively attached to the rear portion of the frame, the second axle having at least third and fourth ground engaging wheels, the second axle being juxtaposed to the at least a first axle for use in supporting the payload of the equipment compartment.

Still another aspect of the subject invention includes a vehicle comprising a third axle operatively attached to the front portion of the frame, the third axle having at least one ground engaging wheel rotatably connected to the third axle for use in steering the vehicle.

Yet another aspect of the invention includes the engine adapted to provide power to each of the first, second, and third axles so that each axle may be a drive axle.

Another aspect of the invention includes ground engaging wheels or a track system having a tread suited for use on uneven, off-road, or other variable terrain, as well as standard paved or graded terrain Yet another aspect of the invention includes ground engaging wheels that are operable after receiving a puncture.

Another aspect of the subject invention includes a vehicle wherein the operator compartment is an enclosed compartment having at least a first door.

Still another aspect of the invention includes a vehicle having an enclosed equipment compartment and an enclosed operator compartment fixedly mounted on the vehicle frame, which is a modified all terrain vehicle frame extended in length up to approximately 30 inches, and having a climate control system operatively communicated to one or more of the equipment compartment and the operator compartment.

Still yet another aspect of the subject invention includes a vehicle further comprising climate controls for controlling the climate control system operatively mounted within the operator compartment.

Another aspect of the subject invention includes a vehicle wherein the equipment compartment is an emergency care treatment compartment having a characteristic length sufficiently large to enclose an industry standard stretcher in a locking system and an emergency medical technician.

Yet another aspect of the invention includes an emergency care treatment compartment having inner surfaces comprised of non-porous, cleanable, disinfectable surfaces.

Yet another aspect of the subject invention includes a fully enclosed equipment compartment having a rear access door and at least one side access panel, which allow access from outside into the interior of the equipment compartment and wherein the at least one side access panel may allow access into a storage area located within the equipment compartment, which may be beneath a bench.

Another aspect of the subject invention may include an engine that is electrically powered requiring frequent recharging after the predetermined period of use. In this manner, the vehicle may be safe for use indoors or where less than ideal ventilation conditions may exist.

Yet another aspect of the subject invention may include an engine that is fueled by propane or another fuel that does not emit toxic fumes during use of the engine and the vehicle. In this manner, the vehicle may be safe for use indoors or where less than ideal ventilation conditions may exist.

The emergency vehicle may be constructed for, but not limited to, off-road conditions, such as may exist at hiking or biking trails, parks, beaches, or other similar remote off-road locations, golf courses, other sports related playing fields, indoor areas, factories, and warehouses. For this reason the vehicle may include four wheel drive and/or all wheel drive as may be required for driving the vehicle over rough terrain. The vehicle may include an enclosed operator compartment with steering and propulsion controls as will be discussed further in a subsequent paragraph. Similarly, a second enclosed equipment compartment, situated toward the rear of the vehicle, may be included for use in treating and transporting injured persons.

Another aspect of the subject invention includes a vehicle that may be a fire fighting vehicle or fire prevention vehicle including equipment and room for personnel within the equipment compartment. Storage bins may be included on the interior or exterior of the vehicle for holding water hoses, portable pump devices, axes, shovels or any other equipment appropriate for use with the present invention.

Yet another aspect of the subject invention may include an emergency service vehicle having a winch which may be selectively, removably attached to the frame of the vehicle at the front or rear of the vehicle.

Still another aspect of the invention includes a vehicle having scene lighting powered by the second power supply.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
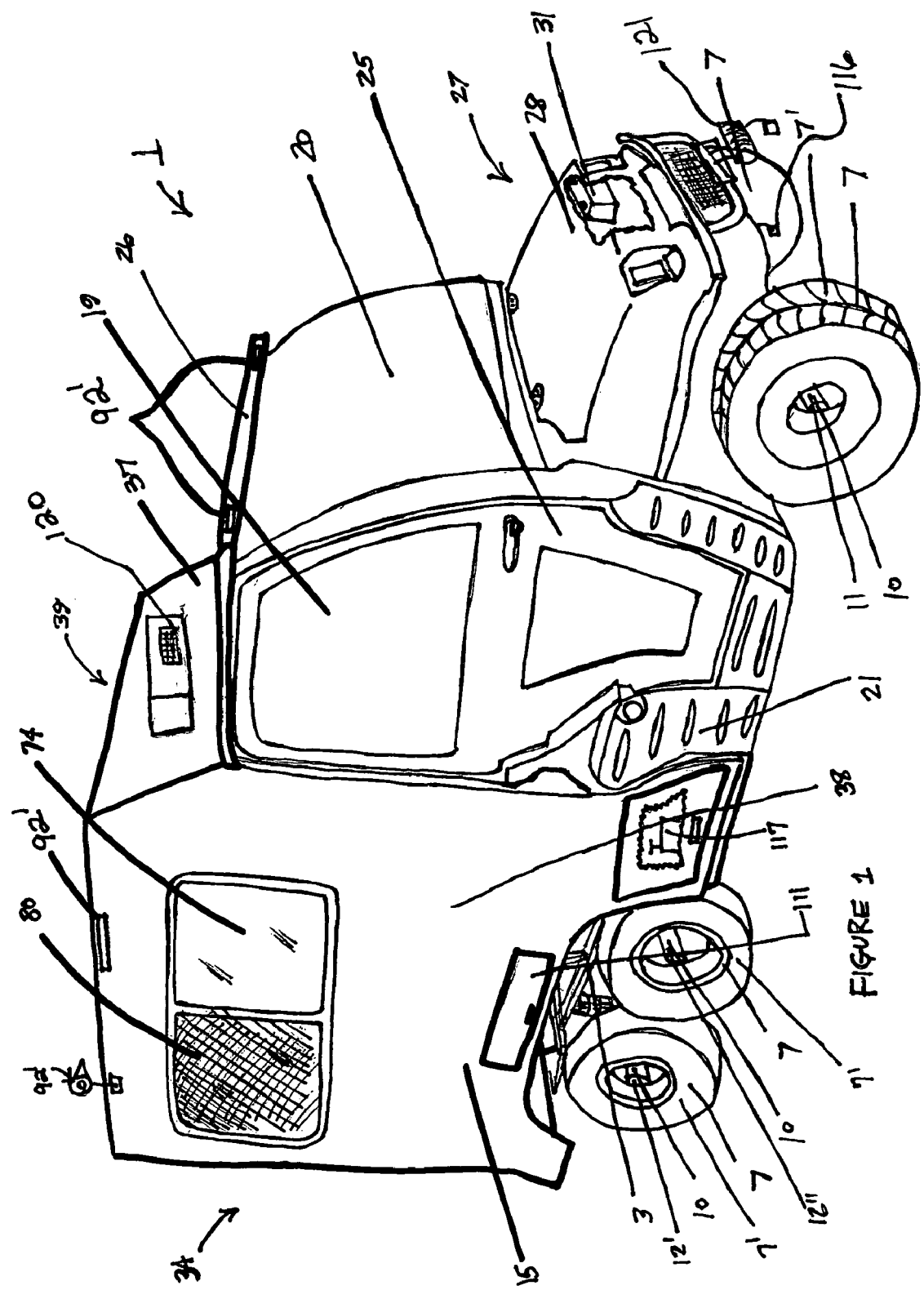
FIG. 1 is a perspective view an off-road emergency care vehicle.

Referring now to the drawings wherein the showings are for purposes of illustrating a preferred embodiment of the invention only and not for purposes of limiting the same, FIG. 1 depicts an emergency care vehicle shown generally at 1. While the vehicle 1 is described herein as an emergency care vehicle, and, while in one embodiment, the vehicle 1 is adapted to provide medical care, it should be understood that in other embodiments the vehicle may be adapted to provide other emergency care services, including fire and rescue services. The emergency care vehicle 1 may include a vehicle frame 3. The frame 3 may be designed to carry a designated payload in the payload region. The frame 3 may be a standard chassis found on stock all-terrain vehicles, such as are manufactured by companies such as Polaris, John Deere, and Kawasaki. These are exemplary of the manufacturers of such vehicles and are not intended to be limiting. Such frames typically have a wheelbase length from between approximately 79 inches and 90 inches. In one preferred embodiment, the frame 3 may be modified by being extended its length as much as approximately 30 inches in order to provide increased available wheelbase for the payload region, which may receive an equipment compartment 15 for retaining, and enclosing emergency equipment, such as a stretcher. Ground engaging maneuvering means for maneuvering the vehicle 1 over the ground may be connected to the frame. The ground engaging maneuvering means may comprise a system of one or more axles (shown in FIG. 1) with ground engaging wheels connected thereto. Thus, for example, ground engaging wheels 7 may be rotatably connected to axles 10 for use in providing maneuverability to the emergency care vehicle 1. In one embodiment, the emergency care vehicle 1 may include a front axle 11 and two rearwardly positioned axles 12', 12". The two rearwardly positioned axles 12', 12" may be included to support the payload of a rearward positioned equipment compartment 15. In an alternate embodiment, the ground engaging maneuvering means may comprise a track system (not shown), such as a caterpillar track system. The track tread may be metal, rubber, or other suitable material selected with sound engineering judgment.

The emergency care vehicle 1 may further include an operator compartment 19. The operator compartment 19 may be an enclosed compartment 19 having a front windshield 20 and side panels 21 situated at the front of the vehicle 1. The side panels 21 of the operator compartment 19 may be sufficiently rigid to support doors 25. The emergency care vehicle 1 may also include an internal combustion engine 27 mounted under the hood 28 of the emergency care vehicle 1. The engine 27 may operate on gasoline. Alternatively, the engine 27 may operate on diesel fuel, propane, natural gas, alcohol or any other fuel as is chosen with sound engineering judgment. It is further contemplated that the engine 27 may be an electrically driven engine. However, any manner of generating locomotive power to drive the vehicle 1 may be chosen with sound engineering judgment.

Continuing, a battery 31 may be securely mounted under the hood 28 of the emergency care vehicle 1. In this manner, the engine 27 may be started by power generated from the battery 31 in a manner known in the art. The engine 27 may further comprise an alternator or other electricity generating device for use in recharging the battery 31 during operation of the vehicle 1. A transmission, not shown, may also be incorporated into the emergency care vehicle 1 for use in transmitted power from the engine 27 to the ground engaging wheels 7 or track system (not shown). In that the use of transmissions for utility or off-road vehicles is well known in the art, no further explanation will be offered at this time. Any manner of transmitting power from the engine to the ground engaging wheels 7 or track system may be selected with sound engineering judgment.

In one embodiment, all of the rearwardly positioned axles 12', 12" and the front axle 11 may be powered so that the vehicle operates with six-wheel drive. In other embodiments, only the rearwardly positioned axles 12', 12" may be powered. In yet another embodiment, power may be selectively applied to the axles 11, 12', 12" by the associated driver to provide the best traction under the environmental conditions.

The equipment compartment 15 may be mounted onto the rear portion 34 of the emergency care vehicle 1. The equipment compartment 15 may be fixedly attached to the chassis 3 of the vehicle 1. The equipment compartment 15 may include a front wall 37, first and second side walls 38, a floor 40 and a top ceiling 39. The ceiling 39 and side walls 38 may be rigid. In this way the equipment compartment 15 may be a totally enclosed compartment 15 as will be discussed in detail below.

With continued reference to FIG. 1, the vehicle 1 may include a rugged suspension. By rugged it is meant that the vehicle may be constructed for use on rough, off-road conditions, such as bumpy, hilly or rocky terrain, wet or marshy conditions, as well as sandy conditions. That is to say that the vehicle may be used on terrain that is not a smooth, paved road or surface. In this manner, the shock absorbing system (not shown) of the vehicle 1 may be reinforced to handle an off-road type of terrain. Similarly, the wheel base may be appropriately selected for use in this type of environment. In one embodiment, the wheel base may be increased by up to 30 inches. However, any manner of suspension and wheel base may be chosen with sound engineering judgment. The vehicle 1 may also include multiple axles, as mentioned above, with tires 7' having tire treads specially designed to give added traction on off-road conditions. In still other embodiments, the tires 7' may be selected to be operable even if punctured. Such tires 7' are commonly known in the art as run-flat tires.

Figure 2:
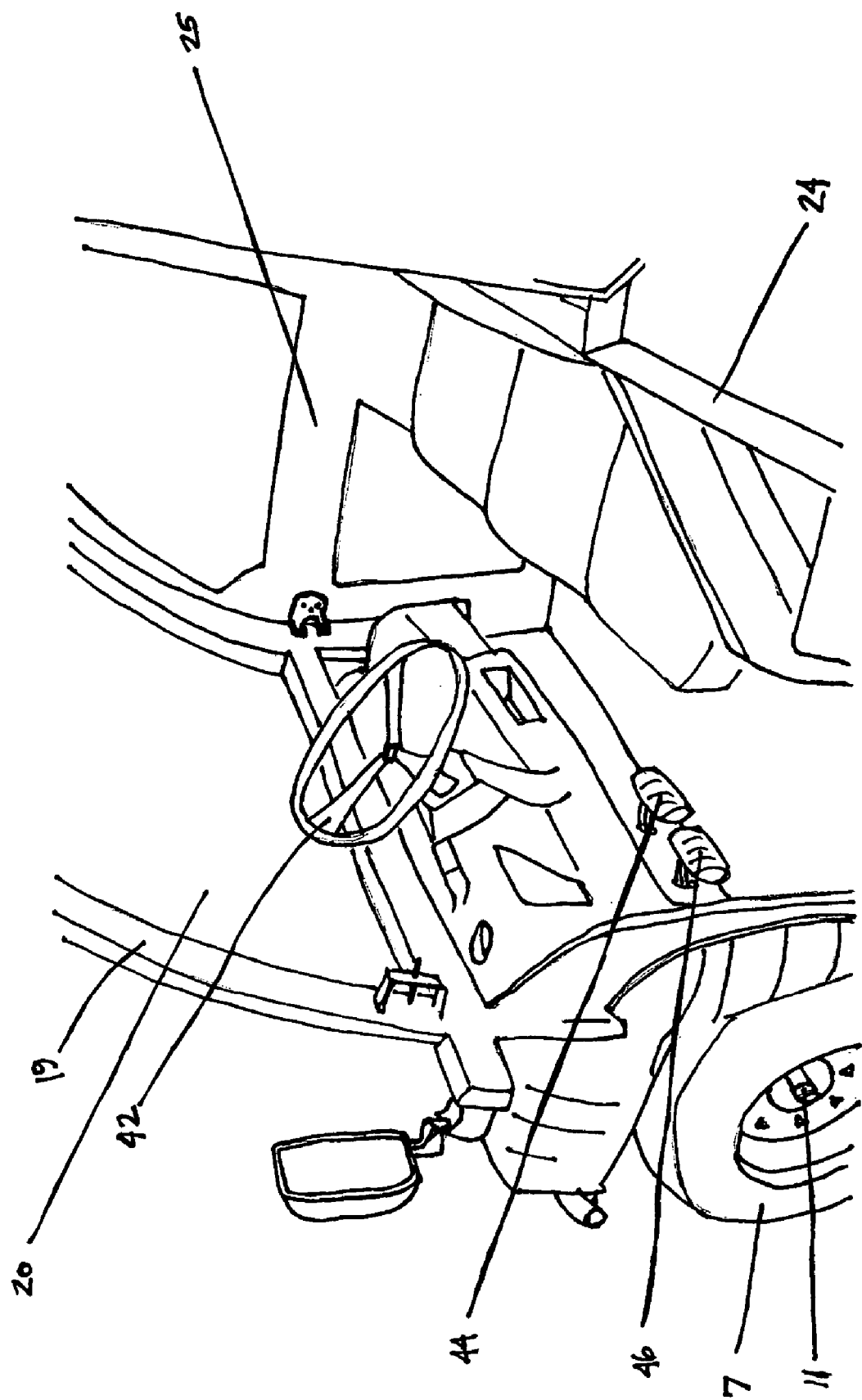
FIG. 2 is a perspective view of the operator compartment of the emergency care vehicle with a door removed.
Figure 3:
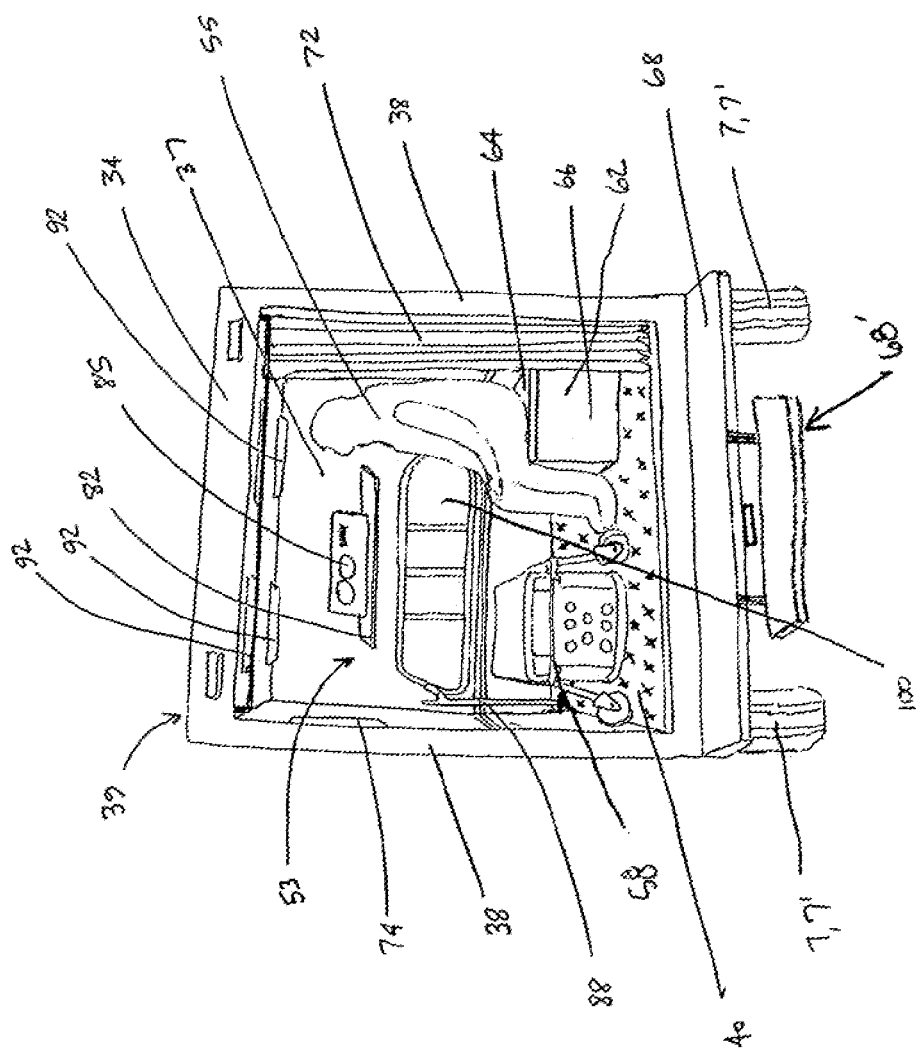
FIG. 3 is a rear view of the equipment compartment of the emergency care vehicle.

With continued reference to FIG. 1 and now to FIGS. 2 AND 3, the operator compartment 19 of the emergency care vehicle 1 may be constructed to hold a vehicle driver and additional emergency vehicle attendants or emergency medical technicians. The operator compartment 19 may be completely enclosed providing a contained environment. The operator compartment 19 may include a steering wheel 42 for use in guiding the vehicle 1 and as well as accelerator controls 44 and braking controls 46 for use in propelling the vehicle 1 in a manner well known in the art. Heat and air conditioning may also be provided in the operator compartment 19 area. Additionally, the operator compartment 19 may also be constructed so as to limit sound into and out of the compartment environment. Accordingly, the walls 24, doors 25, and ceiling 26 of the operator compartment 19 may be constructed from a sound insulating material. In this way, in the event that critical life saving information may need to be communicated to and from a local medical facilities, noisy outdoor activities won't interfere with the life saving work going on within the vehicle confines, and particularly, in the equipment compartment 15. There may be provided a window 100 in the rear wall of the operator compartment, which may allow access from the operator compartment 19 into the equipment compartment 15. The window 100 may be slidably closable. The window 100 may be in addition to other windows provided in the operator compartment 19, which are discussed below. The window 100 may be opened to allow communications and materials to be passed between the operator compartment 19 and the equipment compartment 15. In this respect, it is noted that the rear wall of the operator compartment 19 may serve as the front wall of the equipment compartment 15. In this way, it may be said that the wall is shared. In one embodiment, the doors 25 of the operator compartment may be removably connected to the frame of the operator compartment 19. Any manner of removably connecting the doors 25 to the operator compartment 19 of the vehicle 1 may be chosen with sound engineering judgment. With the doors 25 removed, the operator has quick and easy access into and out of the operator compartment 19. The doors 25 may be constructed from a clear flexible material, including, but not limited to vinyl. The flexible doors 25 may be affixed to the door frame 25' via Velcro, fasteners or other affixing means. It is noted that any front operator compartment utilities, accessories or equipment, including wireless communication devices may be incorporated within the operator compartment 19 of the vehicle as chosen with sound engineering judgment.

With continued reference to FIG. 1 and now to FIG. 3, the equipment compartment or emergency care treatment compartment 15 of the vehicle 1 will now be discussed. The emergency service vehicle 1 may include an equipment compartment 15 fixedly attached to the rear portion of the chassis 3 behind the operator compartment 19. The equipment compartment may be adapted to be a medical treatment compartment 15, a fire fighting or fire prevention compartment 15', a rescue service compartment 15", or the like, depending on the particular embodiment required. In fact, any type of emergency services may be supported and equipped in the equipment compartment 15 in accordance with the present invention. The floor, ceiling and walls of the equipment compartment 15 of the vehicle 1 may include or define a rear cab area 53. In one embodiment, at least one wall may be shared between the operator compartment 19 and the equipment compartment 15. This wall may be provided with a selectively closable window 100 as described herein above. The dimensions of the equipment compartment 15 of the vehicle may be sufficiently high to allow individuals, or emergency medical technicians 55, to sit upright within the rear cab area 53, as shown in FIG. 3. In one embodiment, the ceiling to floor height of the rear cab area 53 may be 55 inches. However, any height of the rear cab area 53 may be chosen with sound engineering judgment. The length of the equipment compartment 15 and the rear cab area 53 defined therein, may be sufficient to enclose within the full length of a person lying down in the enclosed cab area 53. Additionally, the length of the equipment compartment 15 and the rear cab area 53 may be sufficiently long enough to enclose an industry standard stretcher or cot in a locking system, 58. Such stretchers or cots are typically between approximately 78 inches and 84 inches. In this manner, the rear cab area 53 may be a patient treatment area. The equipment compartment 15 may include securing means for locking a stretcher 58 in place during treatment and/or transportation of a patient. Any manner of securing the stretcher 58 to the walls 38 or floor 40 of the equipment compartment 15 may be chosen with sound engineering judgment.

With continued reference to FIG. 3, an emergency technician area may be staged directly laterally across from the stretcher 58. A bench 62 may be included for the technician 55 to sit on during treatment and/or transportation of a patient. The bench top or seat 64 may be hinged with respect to the bench side walls 66 providing a storage area beneath the bench seat 64. In this manner, supplies, accessories and/or equipment may be stored beneath the bench seat 64 for efficient compact storage of necessary medical treatment items. The bench 62, and more specifically the storage area beneath the bench seat 64, may be accessible from both inside and outside of vehicle 1. Access to the storage area beneath the bench seat 64 from the outside of the vehicle 1 may be provided by an outside access panel 111 (shown in FIG. 1), which may be hingedly attached to the outside wall of the equipment compartment 15. The outside access panel 111 may be connected to the equipment compartment 15 by any means selected with sound engineering judgment, which allows for the panel 111 to be opened and the interior of the equipment compartment 15 to be accessed, which may include the bench 62. In one embodiment, the bench 62 may shorter than the overall length of the equipment compartment 15, which may allow the vehicle technician to safely and easily step into the rear service area 53. However, any length of the bench area may be chosen with sound engineering judgment. The equipment compartment 15 may also include a step 68 or a plurality of steps 68' for assisting the technicians 55 into and out of the rear cab area 53. The steps 68, 68' may be stowable, being hingedly attached to the rear of the vehicle chassis 3 or the equipment compartment 15 so that they may be folded away when not in use. Other means of accessing the rear cab area 53 from the rear of the vehicle 3 may be provided, including a ramp (not shown), which may be removably or slidably attached to the rear of the vehicle 3. The entrance into the rear cab area 53 may be covered by flexible curtain 72 secured about all or part of the perimeter of the entrance to the rear cab area 53 via Velcro or any other type of fastening means. The curtain 72 may be opaque or translucent and may be constructed from plastic or fabric. However, it is noted that the curtain 72 may be constructed from any type of material chosen with sound engineering judgment. It is also contemplated that the entrance to the rear service area 53 may include a closeable, lockable door or alternately be left open. In this manner, the curtain 72 may be drawn to maintain privacy during treatment of an individual in the rear cab area 53.

With continued reference to FIGS. 1 and 3, the equipment compartment 15 may include windows 74. Any numbers of windows 74 may be installed in the equipment compartment 15 as are appropriate for use with the present invention including a window 100 between the rear compartment 15 and the front cab 19 of the vehicle 1, as described above. The windows 74 may be slide-ably received by a window frame for use in allowing the windows 74 to open providing ventilation. The windows 74 may also provide for natural light to enter into the rear cab area 53. It is contemplated in an alternate embodiment that the windows 74 may be tinted to prevent people from looking into the rear cab area 53 from the outside affording those inside privacy as needed. Screens 80 may also be included to prevent insects and other creatures from entering the rear cab area 53 while allowing air flow into and out of the rear service area. Any quantity and configuration of windows may be chosen for use with the rear cab area 53 of the vehicle 1.

With continued reference to FIGS. 1 and 3, the walls 38 of the equipment compartment 15 may be sufficiently rigid and sturdy to support storage equipment, trays, bins, accessories and the like. In the case of an emergency medical treatment vehicle 1 for example, a shelf 82 may be secured to the interior wall 38 for storing a heart defibrillator 85 or other device. Alternately, a locked storage bin may be fastened to the wall 38 of the equipment compartment 15 for use in storing fire fighting or fire prevention equipment. Still, any support, storage bin or device may be included within, or secured to the walls of, the equipment compartment 15. In one embodiment, an I.V. stand 88 or holder 88 may be incorporated into the rear cab area 53 for treatment of patients in a manner well known in the art. The I.V. stand 88 may be secured from moving about the interior of the equipment compartment 15 by way of straps and/or clasps, which may be located on the ceiling 39, walls 38, or floor 40 of the equipment compartment 15. However, any means of securing the I.V. holder 88 in place may be chosen with sound engineering judgment. Separately any type of treatment equipment may be included with the equipment compartment 15 and secured in place as described above. Where the equipment compartment 15 is configured for use as a medical care area, the surfaces selected for the ceiling 39, walls 38, floor 40 and bench 62 of the interior of the equipment compartment 15 may be non-porous, washable, disinfectable materials. In the alternative, the walls 38 may be constructed of a fabric membrane set over an internal rigid frame defined by vertical and horizontal members.

Figure 4:
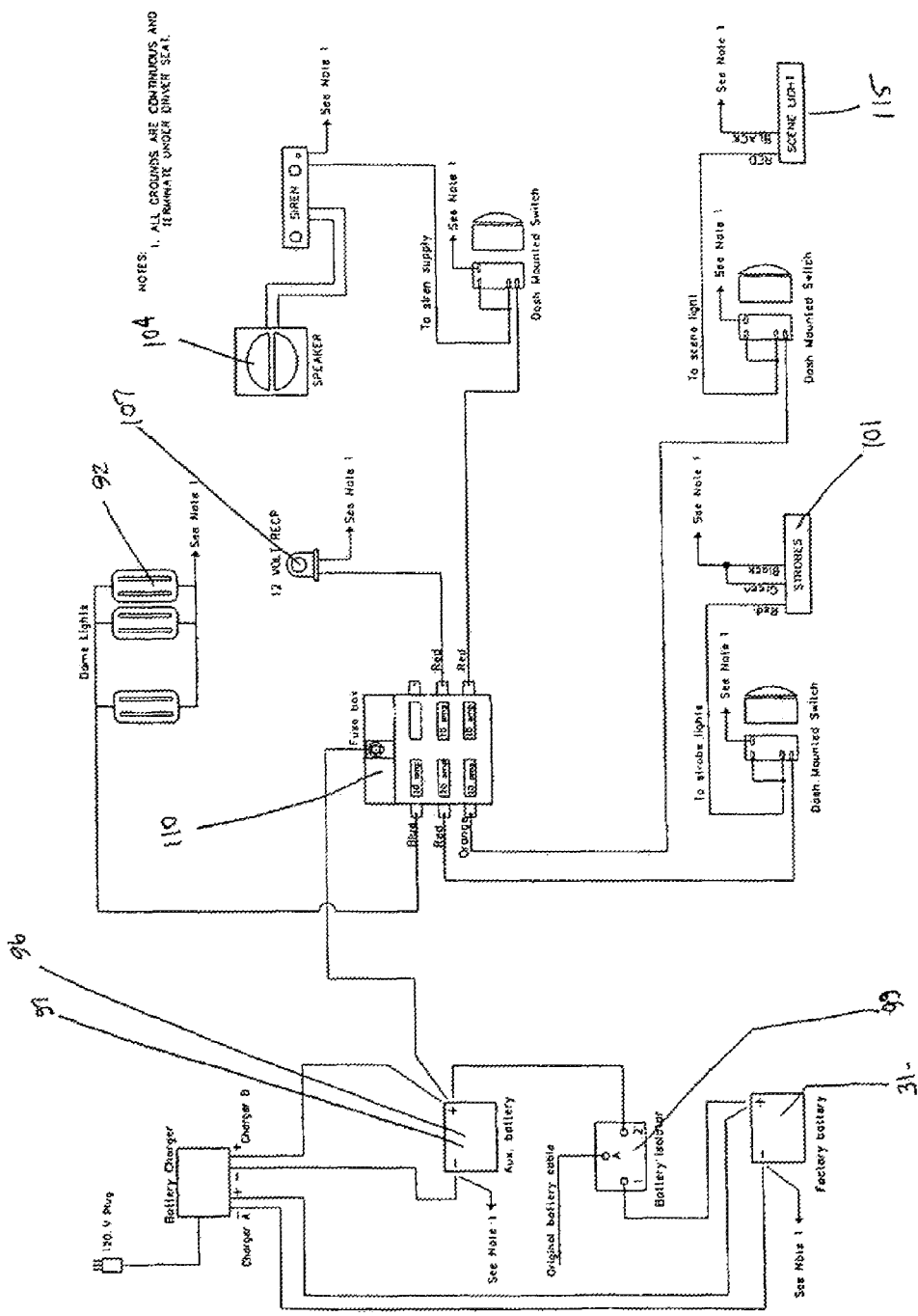
FIG. 4 is a schematic drawing of the auxiliary power supply circuit.

With continued reference to FIGS. 1 and 3 and now to FIG. 4, the rear cab area 53 may include lights 92. In one embodiment, the interior 53 of the equipment compartment 15 may have fluorescent lighting 92 secured to the walls, ceiling and/or floor. Alternately, other low powered lighting may be included within the interior of rear cab area 53, such as LED lighting or any other lighting chosen with sound engineering judgment. Lights 92' may also be included on the exterior of the vehicle and may include strobe lights, emergency lights, and scene lights. Scene lights are high candle power lights that may be directed toward the scene of an accident or other specified location to illuminate the site. The lighting 92' may be powered by a separate isolated electrical power supply 96. In one embodiment, the secondary power supply 96 may comprise a secondary battery 97. By secondary battery it is meant that another battery distinct from the vehicle battery 31 may be included with the vehicle 1. The secondary battery 97 may be a 12 volt battery providing DC power to the lighting of the rear cab area 53. The secondary battery 97 may further be connected to the vehicle alternator, not shown, which may provide a means for charging the secondary battery 97. However, the secondary battery may still be distinctly isolated from vehicle battery 31 via an isolating unit 99 such that the only power drawn from the secondary battery is from lighting or equipment within the equipment compartment 15. A trickle charge may flow from the alternator to the secondary battery 97 in any manner of use as chosen with sound engineering judgment. The secondary battery 97 may additionally or alternatively be provided with a shoreline charger, allowing for the secondary battery 97 to be charged by plugging it into an outside electrical source. In one embodiment, the receptacle 116 for the charger may be located adjacent the engine compartment. However, the receptacle 116 may be located anywhere else within sound engineering judgment. The secondary power supply 96 may include a generator 117. In an alternative embodiment, the generator 117 may be isolated from the second power supply 96, constituting a third power supply. It is contemplated yet in another embodiment, that the secondary power supply 96 may supply power to other components of the vehicle 1 including but not limited to emergency service equipment 85, strobe lighting 101, scene lighting 115, sirens and/or speakers 104 as well as auxiliary power outlets 107. The secondary power supply 96 may communicated to the components through a fuse box 110, breaker switches or other current limiting means.

With continued reference to the FIGURES, the equipment compartment 15 may be provided with climate control means 120, such as a heater or air conditioning unit. The climate control means 120 may be the same as are provided in the operator compartment 19 and the climate of the equipment compartment 15 may be adjusted by closing and opening the window 100 between the operator compartment 19 and the equipment compartment 15, or by means of separate vents provided in the equipment compartment 15. Alternatively, the equipment compartment 15 may be provided with its own climate control means 120, which may be separate from any climate control apparatuses provided in the operator compartment 19. The climate control means 120 may be operatively connected to the secondary power supply 96 or to the third power supply, which may be a generator 117.

With reference to FIG. 1, the vehicle 1 may include a winch 121. The winch 121 may be suitable for pulling items to the vehicle 1 or for pulling vehicle 1, such as out of a ravine or ditch. The winch 121 may be attached to the frame 3 near the front of the vehicle 1. Alternatively, the winch 121 may be attached to the frame 3 near the rear of the vehicle 1. The winch 121 may be removably attached to the frame 3 and may be selectively positionable on either the front or rear of the vehicle.

With reference to all of the FIGURES, the vehicle may be constructed from an existing utility vehicle. Any type of utility vehicle having the core features described herein may be chosen with sound engineering judgment for use with the present invention. The utility vehicle may be partially disassembled exposing the vehicle frame 3. In one embodiment, the operator compartment may remain unaltered. The vehicle frame 3 may be lengthened up to approximately 30 inches to facilitate the securing thereto of an equipment compartment 15 sized to enclose an industry standard stretcher in a locking system, without impinging into the area of the operator compartment 19. Any manner of installing the equipment compartment 15 to the frame 3 may be chosen with sound engineering judgment. Similarly, the secondary power supply 96, along with related circuitry, may be also installed and connected to the lighting within the rear service area cab as chosen with sound engineering judgment.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

I claim:

1. An off road emergency vehicle, comprising:
   an all-terrain vehicle frame, the frame having front and rear portions;
   a suspension attached to the frame and adapted for use in traversing an uneven terrain;
   ground engaging maneuvering means for maneuvering the vehicle over the uneven terrain;
   an engine operatively attached to the vehicle frame for use in providing locomotion to the vehicle;
   an all wheel drive system that provides traction to the ground engaging means over the uneven terrain;
   a vehicle battery operatively connected to the engine;
   an operator compartment fixedly attached to the front portion of the vehicle frame;
   an equipment compartment fixedly attached to the rear portion of the frame, the equipment compartment having a length sufficiently long enough to enclose a stretcher having a length between approximately 78 inches and 84 inches; and
   a rechargeable, secondary power supply operatively connected to provide power to the equipment compartment.

2. The vehicle of claim 1, wherein the secondary power supply comprises a second battery operatively connected to provide power to the equipment compartment, the second battery being operatively communicated to the engine for use in recharging the second battery.

3. The vehicle of claim 2, wherein the ground engaging means comprises:
   a first axle operatively attached to the rear portion of the vehicle frame;
   at least first and second ground engaging wheels operatively rotatably attached to the at least a first axle for use in maneuvering the vehicle;
   a second axle operatively attached to the rear portion of the frame, the second axle having at least third and fourth ground engaging wheels, the second axle being juxtaposed to the first axle for use in supporting the payload of the equipment compartment.

4. The vehicle of claim 3, further comprising:
   a third axle operatively attached to the front portion of the frame, the third axle having at least one ground engaging wheel rotatably connected to the third axle for use in steering the vehicle.

5. The vehicle of claim 4, wherein the operator compartment is an enclosed compartment having at least a first door; and,
   wherein at least one wall of the operator compartment is shared by the equipment compartment.

6. The vehicle of claim 4, wherein the all wheel drive system selectively supplies power to at least two of the first, second, and third axles.

7. The vehicle of claim 6, wherein the all wheel drive system supplies power to each of the first, second, and third axles.

8. The vehicle of claim 4, wherein at least one of the ground engaging wheels attached to at least one of the first, second and third axles include a tire that remains inflated after a puncture.

9. The vehicle of claim 8 further comprising:
   an equipment compartment wall;
   fluorescent lighting within the equipment compartment;
   tread on the ground engaging wheels, wherein the tread is suited for use on uneven, off-road, or other variable terrain;
   wherein the operator compartment has an environmentally controlled atmosphere;
   wherein the stretcher ranges between approximately 78 inches and 84 inches in length; and
   wherein the equipment compartment has a climate control that is connected to a third power supply which is a generator.

10. An off road emergency vehicle, comprising:
    an all terrain vehicle frame having a wheelbase length no greater than 120 inches, the frame having front and rear portions;
    at least a first axle operatively attached to the vehicle frame,
    at least first and second ground engaging wheels operatively rotatably attached to the at least a first axle adapted for use in maneuvering the vehicle over an uneven terrain;
    an engine operatively attached to the vehicle frame for use in providing locomotion to the vehicle;
    a vehicle battery operatively connected to the engine;
    an operator compartment fixedly attached to the front portion of the vehicle frame;
    an equipment compartment fixedly attached to the rear portion of the frame, the equipment compartment having a length sufficiently long enough to fully enclose a stretcher having a length between approximately 78 inches and 84 inches; the equipment compartment including a bench; and,
    a secondary power supply operatively connected to provide power to the equipment compartment.

11. The vehicle of claim 10 wherein the at least a first axle is operatively attached to rear portion of the frame; and, further comprising:
a second axle operatively attached to the rear portion of the frame, the second axle having at least third and fourth ground engaging wheels, the second axle being juxtaposed to the at least a first axle for use in supporting the payload of the equipment compartment;
a third axle operatively attached to the front portion of the frame, the third axle having at least one ground engaging wheel rotatably connected to the third axle for use in steering the vehicle; and
wherein the engine supplies power to each of the first, second and third axles.

12. The vehicle of claim 10 wherein the secondary power supply comprises:
a secondary battery, and;
a charger that charges the secondary battery by plugging into an outside electrical source.

13. The vehicle of claim 12 further comprising:
a generator.

14. The vehicle of claim 13 further comprising:
a winch, the winch being selectively removably positionable adjacent the front and rear portions of the frame.

15. The vehicle of claim 14 further including:
a climate control means for controlling the climate in the equipment compartment.

16. The vehicle of claim 15 wherein the climate control means is an air conditioner; and, wherein the air conditioner is operatively connected to the generator.

17. The vehicle of claim 16 further comprising;
scene lighting operatively connected to a power supply selected from the group consisting of the secondary power supply and the generator.

18. The vehicle of claim 17 further comprising:
an equipment-compartment wall;
fluorescent lighting within the equipment compartment;
tread on the ground engaging wheels, wherein the tread is suited for use on uneven, off-road, or other variable terrain;
wherein the operator compartment has an environmentally controlled atmosphere;
wherein the stretcher ranges between approximately 78 inches and 84 inches in length; and
wherein the equipment compartment has a climate control that is connected to a third power supply which is a generator.

19. The vehicle of claim 10, wherein the equipment compartment includes a floor, a ceiling, and at least two walls; and,
wherein at least one surface of each of the ceiling, floor and at least two walls is non-porous.

20. An off road emergency vehicle, comprising:
an all terrain vehicle frame having front and rear portions;
first, second and third axles operatively attached to the vehicle frame;
at least first and second ground engaging wheels operatively rotatably attached to each of the first, second and third axles for use in maneuvering the vehicle over an uneven terrain;
an engine operatively attached to the vehicle frame for use in providing locomotion to the vehicle;
a vehicle battery operatively connected to the engine;
an operator compartment attached to the front portion of the vehicle frame, the operator compartment having a door;
an equipment compartment attached to the rear portion of the frame, the equipment compartment having a ceiling, a floor, a front wall and at least first and second side walls, wherein the front wall is shared with the operator compartment and includes a window, and wherein, the first side wall includes an access panel which may be opened from the exterior of the vehicle and provides access to the interior of the equipment compartment, the equipment compartment having a length sufficiently long enough to fully enclose a stretcher having a length between approximately 78 inches and 84 inches; and
a secondary power supply operatively connected to provide power to the equipment compartment, the secondary power supply comprising a secondary battery and a charger that charges the secondary battery by plugging into an outside electrical source.

21. The vehicle of claim 20, wherein the secondary power supply further comprises:
a generator.

22. The vehicle of claim 21, wherein the engine is adapted to operate on a fuel selected from the group consisting of gasoline, diesel fuel, natural gas, propane, and alcohol.

23. The vehicle of claim 21, wherein the engine is adapted to operate on electricity.

24. The vehicle of claim 21 further comprising:
an equipment compartment wall;
fluorescent lighting within the equipment compartment;
tread on the ground engaging wheels, wherein the tread is suited for use on uneven, off-road, or other variable terrain;
wherein the operator compartment has an environmentally controlled atmosphere;
wherein the stretcher ranges between approximately 78 inches and 84 inches in length; and
wherein the equipment compartment has a climate control that is connected to a third power supply which is a generator.

* * * * *